July 7, 1964 A. I. COHEN 3,140,347
APPARATUS FOR THE PROJECTION OF DISTORTED IMAGES
Filed March 15, 1960 2 Sheets-Sheet 1

3,140,347
APPARATUS FOR THE PROJECTION OF
DISTORTED IMAGES
Aaron Isaac Cohen, 60 Kinfauns St., Sydenham,
Johannesburg, Transvaal, Republic of South Africa
Filed Mar. 15, 1960, Ser. No. 15,236
10 Claims. (Cl. 178—5.8)

The present invention relates to the production of optical effects, in particular to a method and means for interpreting or accompanying music or sound in terms of light.

The idea of expressing music in terms of coloured light is old. Most systems for this purpose are based on the assignment of specific colours to specific notes of the scale and varying the intensities of these colours in accordance with the intensity of the sound. Usually the light is projected, sometimes onto curtains to produce a diffuse or flowing effect. With many of these systems the performance becomes either monotonous after a while, or the effect is too tiring and tends to produce headaches. Furthermore, with many of these systems there is a tendency to produce little more than a dirty white colour as soon as several colours of high intensity overlap.

Extremely complicated mechanisms have been suggested for producing so-called mobile colour, either for its own sake or as an accompaniment to music. The cost of such devices with which continuously moving or changing or flowing images could be produced was formidable and the effect by no means beyond criticism.

It is an object of the present invention to provide a method and means for the specified purpose which largely or wholly overcome the above-mentioned difficulties and drawbacks, and more particularly which produce light effects as an optical interpretation or accompaniment of music, which are pleasing to the eye, do not tend to become monotonous or tire the observer, and which are suitable for decorative, entertainment and psychotherapeutic purposes.

It is a further object of the present invention to provide a method and means suitable for producing abstract, normally coloured images on cinematographic films and/or in television, in particular as an accompaniment or interpretation of music or sound.

Further objects, applications and advantages of the invention will become apparent from the following description:

The method in accordance with the present invention comprises projecting a beam of light onto a patterned flexible reflector member, moving various reflective parts of the reflector member relative to one another in a controlled manner and producing the resulting continuously changing, patterned, distorted, reflected image of the beam on a screen.

Two or more of the said beams may be projected onto the reflecting member simultaneously and the resulting images may be superimposed on one another. Each beam may be of any desired constant or varying colour. Colour filters may be inserted in the path of the light beam and may be changed from time to time or continuously, either at will or automatically. The intensity of any one beam of light may also be varied, either manually or automatically, e.g. electronically.

Apart from the abovementioned relative movement of the various parts of the reflecting member, an angular to and fro movement may be imparted on the reflecting member as a whole, e.g. in the rhythm of the music or sound being interpreted or accompanied. It is furthermore advantageous to superimpose the images reflected from two or more separate reflecting members on the screen.

It is also preferred to provide a normally coloured background illumination on the screen, preferably predominantly near the margin of the screen. The intensity of this background illumination may be varied in accordance with the intensity of any sound or music being accompanied or interpreted. Preferably, various parts, in particular individual colours of the said background illumination, are varied in intensity in accordance with the intensities of various tone levels or pitches of sounds or music being accompanied or interpreted.

Any number of variables in the above-described process may be controlled by such means as multi-track tape recorders or the like.

The process may be carried out on any desired scale. It may be applied for providing a projected background for stages, e.g. in ballet performances or revues.

The process may also be applied to the manufacture of abstract cinematographic films, in which case the images produced on the screen may be recorded by means of any suitable type of cinematographic camera or equivalent.

The process may also be successfully employed for the production of television programmes, in particular colour television programmes. In this case, the images may either be recorded by a television camera direct, or they may be first recorded on a cinematographic film as specified in the preceding paragraph and suitably televised afterwards.

The process may be carried out with suitable means in accordance with the invention, which comprise a patterned reflector member comprising a flexible supporting material, the surface of which is reflective or rendered partly or wholly reflective or to which reflective bodies or materials are rigidly or movably attached, which reflector member is adapted to be deformed in a controlled manner so as to produce a distorted image or images. For this purpose one or more, preferably a plurality of deforming members are provided which, by suitable means, engage suitable localities of the reflector member and which serve to push or pull the supporting material of the reflector member to the desired deformed state.

The reflector member may, for example, comprise a piece of reflective metal foil, e.g. tin or aluminum foil as a flexible supporting material having a reflective surface. If desired, parts of the reflective material may be covered up or cut out so as to produce a pattern of non-reflective areas. It is also possible to reinforce the metal foil with a suitable backing material, e.g. paper, leather, plastic sheet, textile material.

Alternatively a flexible supporting material, such as paper, textile material, leather, plastic sheet or the like may be used, the surface of which has been coated with a reflective paint in a patterned manner. Rubber sheet and other sheet materials, which can be stretched elastically to a considerable extent, are normally unsuitable, however.

The reflective surfaces in the aforesaid cases have a crumpled or randomly patterned surface texture. However, the pattern of the reflective part of the reflector member may also be quite regular.

It is furthermore possible to use a flexible supporting material as specified above to which reflective bodies or particles have been attached. Such reflective bodies or particles may be in the form of a surface coating of glitter material, reflective beads or the like. Such a coating may be continuous or in pattern form. Alternatively, small mirrors of any desired shape may be provided on the supporting material, either laid out irregularly or in the form of a regular pattern.

It is also possible to suspend the reflective bodies pendant-like from the supporting material.

The reflector members may be interchangeable.

The aforesaid deforming members may be adapted to be hooked onto or otherwise attached to lugs or the like provided on the rear side of the reflector member. In another embodiment ferromagnetic bodies are provided on the rear side of the reflector member, and the deforming members are provided with corresponding magnets, e.g. at their ends, preferably electromagnets, be means of which they adhere to, attract or repel the said bodies of ferromagnetic material.

The deforming members may be independently actuated by hand or by mechanical, pneumatic, hydraulic or electromagnetic or any other suitable means, if desired fully automatically.

In one embodiment, the deforming members take the form of connecting rods which are attached to a camshaft or camshafts. If a plurality of connecting rods are used, each of which moves independently or semi-independently of the other, the variety of deformations which can be produced on the reflector member becomes very large. Furthermore, by continuously changing the relative positions of the deforming members, it is possible to produce continuously changing surface contours of the reflector member.

Such continuously changing relative positions may be produced, for example, in the case of a camshaft operated device, by driving the camshaft or shafts with a motor, either at fixed or at variable speeds. In the preferred embodiment, the gear ratio between different camshafts can be altered to produce different effects.

Preferably, the said reflector means are also adapted to move as a whole relative to the light source. They may, for example, be suspended from horizontal pivots, mechanical or electromagnetic means being provided to control the angle of the device relative to the light beam at any moment. These means may be adapted to impart a pendulum movement to the reflector means in accordance with rhythmic beat of the music. The frequency of this pendulum movement may be either determined by the operator of the device or may be controlled electronically from an amplifying system.

For facilitating the change-over from one type of reflector to another, a number of reflector members of different types may be assembled in the form of or mounted on an endless belt supported by suitable pulleys and adapted that any desired section of the belt may be moved into the light beam.

It is furthermore advantageous to duplicate the whole mechanism hereinbefore described for the superimposition of contrasting mobile patterns.

The means specified above may, for example, be incorporated in a device for interpreting or accompanying music or sound in terms of light, in accordance with the invention, which comprises means suitable for projecting a continuously variable, mobile pattern or image or nebulous image or the like, comprising reflector means, the various parts or portions of the reflecting surface or surfaces of which are movable relative to one another, in a controlled manner, and further comprising one or more sources of light of any desired colour or colours adapted to be reflected by the said reflector means. The intensity of the light sources may be variable.

Preferably, the device is employed in combination with either a translucent or a reflective screen, the projection in the former case taking place from behind the screen and in the latter from the front. If desired or required, the screens may embody materials which are fluorescent when irradiated by light.

Preferably, the surface or surfaces onto which the said projection takes place are adapted to be illuminated by additional light sources to create a coloured background effect. These light sources are preferably of different colours and provided with reflectors or other suitable means by which the screen area covered by the light from any one source is controlled. The positions of these reflectors and/or light sources may be variable. A particular advantage of this arrangement is that the overlapping and merging of different colours on the screen can be controlled to avoid unpleasant, undefined colour mixtures.

The said light sources preferably take the form of incandescent lamps. The intensities of some or all of these lights are variable in the preferred embodiments. The variation of the various light intensities may be controlled from an amplifier system, e.g. by means of thyratrons in a manner known per se. Particularly striking and beautiful effects can be obtained if the intensities of the different colours are varied in relationship to the pitch of the music. Thus, one particular colour may be controlled by the trebles, another by the bass and a third by the intermediate tone range. White light or additional colours may also be blended into the background, either automatically or manually controlled.

It is furthermore possible to use ultraviolet light for special fluorescent effects.

Means may also be provided for automatically controlling some or all of the variables in the abovementioned apparatus in synchronisation with a recorded piece of music, or the like. For this purpose a multi-track tape recorder or equivalent means may be employed, one or more tracks carrying the music or the like, and the other tracks, via switches, relays, solenoid controls and the like, automatically adjusting and actuating a speed regulator and reversing controls for the electric motors driving the camshaft mechanisms or equivalent of the reflecting members, and/or actuating light intensity controls for the projectors and/or automatically actuating selector relays for selecting interchangeable flexible reflectors and/or actuating colour selector relays for automatically inserting the filters of the desired colours in the path of the light beam or light beams from the projector or projectors and/or actuating the thyratron controls for the electric lamp providing the background illumination. These various electronic means need not be specified in detail since they are known per se and the manner of application in carrying out the present teachings will be obvious to those skilled in the art of electronics.

The invention and how it may be put into practice will be further elucidated by way of example with reference to the accompanying drawings without thereby limiting the scope of the invention.

Figure 5:
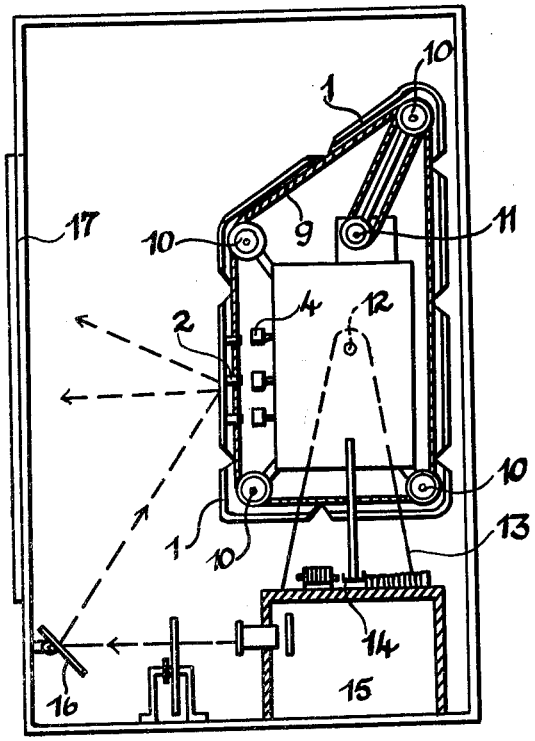
FIGURE 5 shows the same device in side elevation without the background reflectors.

Referring to the drawings, 1 is the flexible reflector member, the edges of which are supported in some embodiments, although this is not shown in the drawings. On the rear of the reflector member iron bodies 2 are provided to which ends of the deforming rods 3 adhere by means of electromagnets 4. The deforming rods are actuated by camshafts 5. In one embodiment, these camshafts are connected by separate gear drives for every camshaft to an electric motor. The gear ratios are variable.

Instead of the iron bodies 2 and electromagnets 4, it is also possible to employ hooks and corresponding perforated lugs or similar means.

Figure 2:
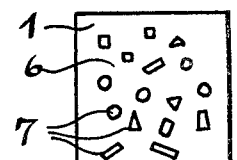
FIGURE 2 shows an example of a flexible reflector member suitable for use in the device (front elevation).
Figure 3:
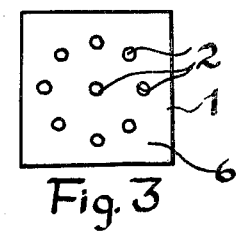
FIGURE 3 shows the rear side of the reflector member.

The reflector member 1 may be any one of the embodiments described in the general description, for example, the embodiment shown in FIGURE 2 which comprises a backing 6 of a flexible supporting material. In this example oil cloth is used as the backing, but paper, leather, various textile materials and plastic are also suitable. Small pieces of mirror 7 of various shapes are attached at random to the backing 6. The mode of attachment can be either firm and rigid or pendant-like. The reflector member is interchangeable.

In use, a light source 8 throws a beam of light onto the reflector member 1 from which an image is reflected onto a screen (not shown). The pattern produced on the screen will depend on the type of reflector member used and on the relative positions of the deforming members 3. If the deforming members are kept moving, the projected pattern or image will continuously change or flow.

Figure 4:
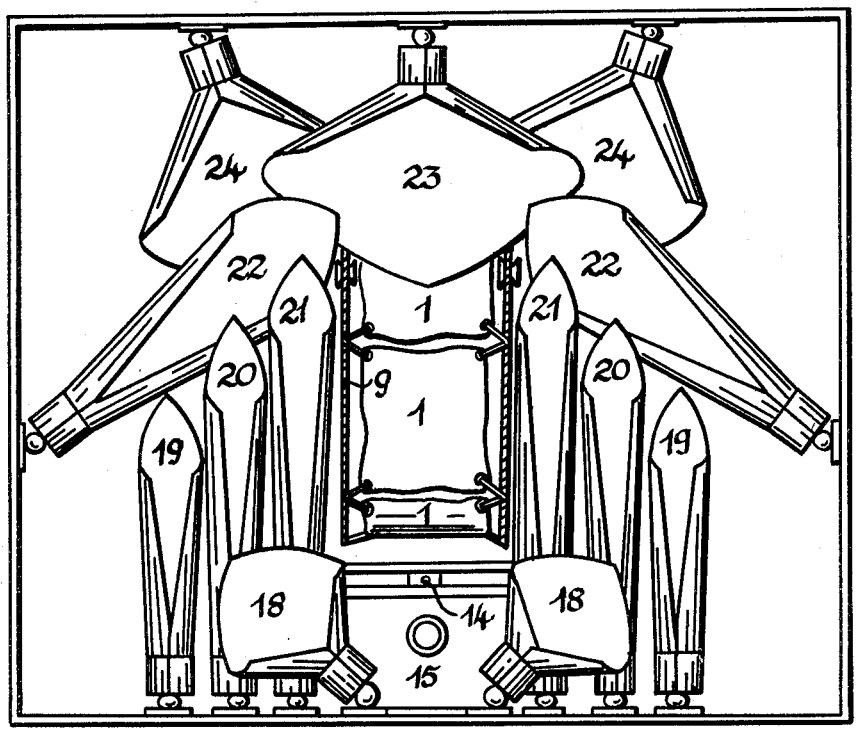
FIGURE 4 represents a front elevation (translucent screen removed) of a device in accordance with the invention for interpreting or accompanying music in terms of light.

In the embodiment shown in FIGURES 4 and 5, the flexible reflector members 1 are mounted on an endless belt system 9 supported by pulleys 10. The mechanism 11 serves to move the desired reflector surface into the light beam. The whole flexible reflector mechanism is supported by a horizontal pivot 12 on a stand 13. It can be set into an oscillating rocking motion by the spring and electromagnet 14. A projector 15, fitted with a revolving colour filter, throws a beam of light onto a mirror 16 from which it is reflected against the flexible reflector 1 whereby a pattern or image is formed on the translucent screen 17.

A changing background effect is created by coloured light beams thrown onto the screen from reflectors 18 to 24. The reflectors are movably mounted and may be made of any suitable material. Crumpled aluminium foil was found to be suitable. The light sources are coloured incandescent lamps and the light intensities are variable. Some of the lights are controlled via thyratron circuits by an amplifier system.

The invention is not limited to any particular choice of colours. In this particular example, the light from reflectors 18 is a reddish violet, that from 19, 20 and 21 is orange, green and red respectively. Reflectors 22 and 23 throw blue light and reflectors 24 contain daylight lamps.

The arrangement may be such that the intensities of lamps 18 are controlled by the basses of the music, lamps 19, 20 and 21 by the intermediate notes and lights 22 and 23 by the trebles. Lights 24 may be controlled by the operator. However, this is purely optional.

Figure 6:
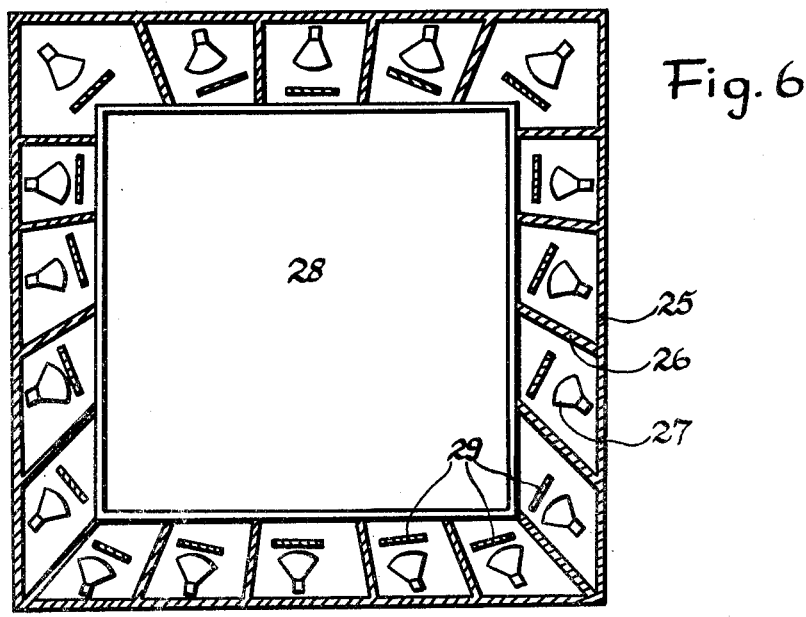
FIGURE 6 represents a sectional rear elevation of a similar device to that shown in FIGURES 4 and 5, illustrating alternative means for providing the background illumination.

The means for providing the background illumination may also be arranged as shown in FIGURE 6 in which 25 represents the box-like framework of the whole apparatus, 26 represents opaque partitions between adjoining electric lamps 27 arranged marginally around a translucent screen 28. The lamps may be of the built-in reflector type. Colour filters 29 are set up in front of the various lamps. The individual lamps 27 are again controlled by thyratron controls.

Figure 7:
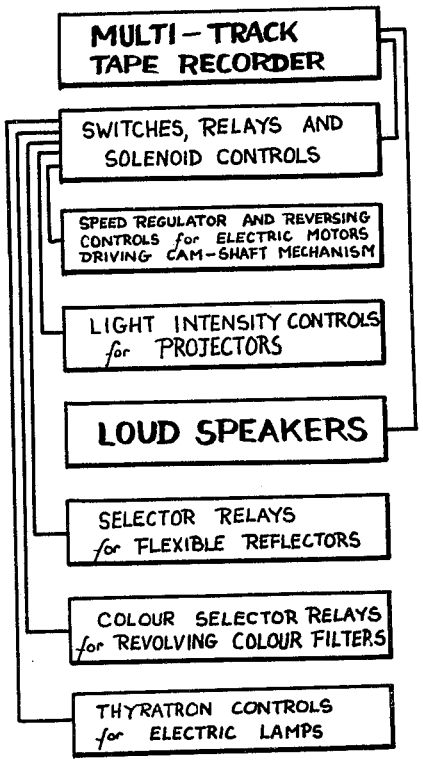
FIGURE 7 represents a diagram showing the relative relationship of the various controls in a fully automatic device in accordance with the invention.

FIGURE 7 is self-explanatory. However, it is pointed out that it is by no means essential that all or as a matter of fact, any of the various variable parts of the device are automatically controlled in the manner indicated in FIGURE 7 or in a similar manner. Manual controls may be resorted to in all cases.

Figure 1:
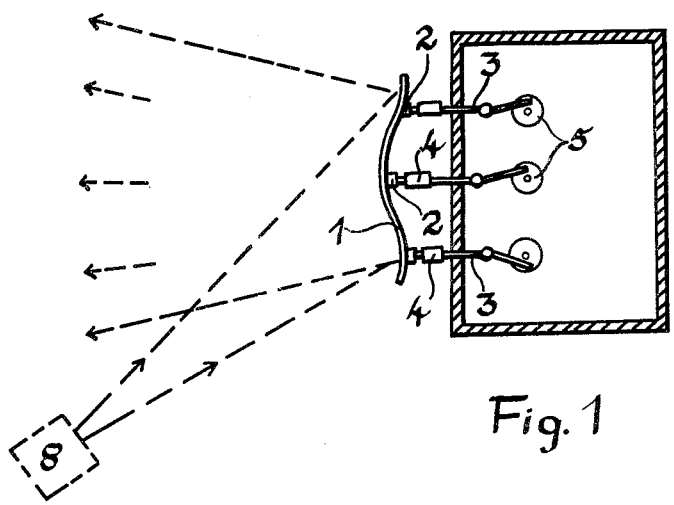
FIGURE 1 shows a diagrammatic representation (in section) of a reflector device for the production of mobile patterns or images in accordance with the invention.

The cams 5 in FIGURE 1 may each be driven individually by separate motors, e.g. variable speed motors. Normally, however, they are interconnected by gears and/or belt and pulley drives in a manner which is obvious. The gears or pulleys may be made interchangeable to change the relative speeds of the individual cams. If desired, the connecting rods 3 could also be connected mechanically or electrically to a keyboard and thus be actuated manually.

The light effects obtainable with this device are very beautiful and striking and do not tend to become monotonous or strain the eyes.

In the device shown in FIGURES 4 to 6 it is possible to remove the translucent screen. Using a 500 watt projector lamp, it was possible to produce beautiful continuously flowing abstract images on the walls and ceilings of a fairly large sized room.

The images produced on the translucent screen with 500 watt projector lamps were successfully recorded on cinematographic colour film.

To explain the principles of the device it was found sufficient to show a single projector and corresponding reflector device only in the apparatus illustrated in FIGURES 4 to 6. However, in practice it is found far more satisfactory to provide at least two independent sets of the said means in the apparatus, so that the distorted images produced by the two or more independent sets may be superimposed. In this manner it is possible to produce the most astounding effects and combinations of flowing and counterflowing patterns. In this connection it is pointed out that a single projector may be used for several independent reflector devices if the light beam is suitably subdivided by optical means known per se.

What I claim is:

1. Means for projecting continuously changing distorted patterned images, which comprise a patterned reflector member comprising a flexible substantially non-stretchable supporting material at least part of which carries a reflective surface physically connected to the supporting material in such a manner that any freedom of movement between the reflective surface and the supporting material is essentially restricted, which reflector member is adapted to be deformed in a controlled manner by deforming means of the apparatus adapted to apply localised forces to different parts of the supporting material so as to produce a distorted image and comprises for this purpose a mounting allowing a substantial amount of free movement to the circumferential outlines of the reflector member.

2. Means for projecting continuously changing distorted patterned images, which comprise a set of interchangeable reflector members, each comprising a flexible substantially non-stretchable supporting material at least part of which carries a reflective surface to which it is physically connected and a plurality of connecting members on the rear side of the supporting material for connecting the reflector member to a corresponding plurality of deforming members which serve to displace the various parts of the supporting material to the desired deformed state of the reflector member while the lateral confinements of the reflector member are substantially free to follow the deformation as dictated by the nature of the supporting material.

3. Means for projecting continuously changing distorted patterned images which comprise a patterned reflector member comprising a flexible substantially non-stretchable supporting material at least part of which carries a reflective surface to which it is physically connected and which means further comprise a plurality of cam-driven connecting rods engaging various parts of the rearside of the supporting material so as to displace the various parts of the supporting material to the desired deformed state of the reflector member while the lateral confinements of the reflector member are substantially free to follow the deformations as dictated by the nature of the supporting material.

4. Means as claimed in claim 3 in which several of the cams driving the connecting rods are geared to a prime moving member with different gear ratios.

5. Means for projecting continuously changing distorted patterned images which comprise a patterned reflector member comprising a flexible substantially non-stretchable supporting material, at least part of which carries a reflective surface to which it is physically connected, which reflector member is adapted to be deformed in a controlled manner so as to produce a distorted image while the lateral confinements of the reflector member are substantially free to follow the deformations as dictated by the nature of the supporting material and which reflector means as a whole are supported so as to be capable of angular movement relative to the said beam of light, means being provided for imparting a pendulum movement to the reflector means.

6. A device for interpreting and accompanying music and sound in terms of light, which comprises at least one set of means suitable for projecting a continuously variable, mobile patterned image, comprising reflector means having reflective parts which are physically interlinked yet movable relative to one another to a limited extent and in a controlled manner by deforming means of the apparatus, adapted to apply localised forces to parts of the reflector means essentially normal to the latter, and further comprising substantially in front of the reflector means at least one source of light of any desired colour adapted to be reflected by the said reflector means.

7. A device as claimed in claim 6 in which the means for projecting a continuously variable mobile patterned image comprise a patterned reflector member comprising a flexible substantially non-stretchable supporting material at least part of which carries a reflective surface to which it is physically connected, which reflector member is adapted to be deformed in a controlled manner by the said deforming means so as to produce a distorted image and comprises for this purpose a mounting allowing a substantial amount of free movement to the circumferential outlines of the reflector member.

8. A device as claimed in claim 6, which further comprises additional light sources for creating a background effect on the projecting surface, at least part of the intensities of the said light sources being variable and the areas illuminated by at least some of the light sources being at least partly confined to well-defined substantially separate areas by suitable screening means.

9. A device as claimed in claim 8 in which the variation of the various light intensities is controlled from an amplifier system for music and sound in such a manner that the intensities of different colours in the said well-defined areas are varied in relationship to the pitch of the music.

10. Means for projecting continuously changing distorted patterned images, which comprise a patterned reflection member comprising a flexible substantially non-stretchable supporting material at least part of which carries a reflective surface physically connected to the supporting material, which reflector member is adapted to be deformed in a controlled manner so as to produce a distorted image and comprises for this purpose a mounting allowing a substantial amount of free movement to the outlines of the reflector member, and a plurality of deforming members which, by suitable means, engage suitable localities of the reflector member and which serve to displace the various of the supporting materials to the desired deformed state of the reflector member.

References Cited in the file of this patent

UNITED STATES PATENTS

| | | |
|---|---|---|
| 1,977,997 | Patterson | Oct. 23, 1934 |
| 2,131,934 | Burchfield | Oct. 4, 1938 |
| 2,411,804 | Plebanek | Nov. 26, 1946 |
| 2,677,297 | Wetzel | May 4, 1954 |
| 2,707,103 | Fischinger | Apr. 26, 1955 |